Patented June 30, 1931

1,812,322

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

FINISH REMOVER

No Drawing.    Application filed February 26, 1927.   Serial No. 171,384.

The invention relates to solvents adapted to remove from wood, metal and other solid materials, films or coatings deposited thereon for ornamentation or protection. Examples of such films are those which result from painting, varnishing, lacquering, enameling or waxing. The film usually contains a natural or synthetic gum, resin, wax or oil, or an oxidation product or other derivative thereof, or a cellulose derivative such as nitrocellulose; and it may contain pigment, dye, or other auxiliary substance. Compositions of the class to which the invention belongs are ordinarily called "finish removers" or simply "paint removers".

The prime requisite in a finish remover is a solvent which will act upon and dissolve a large proportion of the finish films likely to be encountered. The utility of the preparation is of course greater the more rapid its solvent action on finishes. In addition the solvent should be reasonably cheap, compatible with auxiliary agents useful in such compositions, and non-injurious to users of the composition or the materials from which the finish is to be removed.

In compounding finish removers it has been found that the solvents otherwise most nearly meeting the requirements are usually more volatile than is desirable, and it has usually been necessary to incorporate a material, such as paraffine, to prevent too rapid evaporation. Such evaporation deterrent usually has little or no solvent action of its own, and it may impair the dissolving power of the solvent. In addition the evaporation deterrent often leaves a greasy or waxy film on the surface which interferes with the application of a new finish.

I have discovered that the esters of the ethers of the glycols and polyglycols have properties which well adapt them for use in finish removers. Their ability to dissolve finish films is excellent, and they evaporate much less rapidly than the solvents (such as the lower ketones) which have heretofore been most generally used. The residual liquid may be completely removed from the surface by wiping and evaporation, and unlike paraffine and other waxy evaporation deterrents leaves no interfering film on the surface. The use of the solvents of my invention makes it unnecessary to use waxes and the like in detrimental proportions. Many of the compounds of the invention form excellent solvent mixtures with more volatile solvents, the mixture by virtue of its content of ester of glycol or polyglycol ether being sufficiently nonvolatile.

The mono ethers of the glycols can be made by the methods described in the application of Charles O. Young, Ser. No. 691,283, filed February 7, 1924, now U. S. Patent No. 1,696,874, while the production of the mono ethers of the polyglycols is described in my application Ser. No. 44,930, filed July 20, 1924, now U. S. Patent No. 1,633,927. Methods suitable for esterifying these ethers are described in my application Ser. No. 110,286, filed May 19, 1926.

The boiling point of the acetate of the ethyl ether of diethylene glycol

is approximately 208° C., while the boiling point of the corresponding compound of triethylene glycol is about 265° C.

The type formula for the compounds comprised in the invention is

where R is an acidyl group, such as $CH_3CO$; $R_1$ is an alkyl or aryl group; $n$ and $x$ are any integers; and the dotted line is a simple bond or a divalent radicle. Thus, when $n=x=1$ and the dotted line stands for a simple bond, the formula represents an ester of an ether of ethylene glycol: when $n=x=2$ and the dotted line stands for $-OC_2H_4O-$, the formula represents an ester of an ether of triethylene glycol: and where R stands for $CH_3CO$, $R^1$ stands for $C_2H_5$, $n=2$, $x=3$, and the dotted line stands for $-O-$, the acetate of the ethyl ether of ethylene-propylene glycol is represented. In general I prefer compounds of the polyglycols and especially esters, such as the acetates, of the ethyl ethers of the di- or tri-ethylene glycols.

I claim:

1. In a process of removing finish coatings from surfaces, the step of disintegrating the coating by attacking an organic constituent thereof by applying thereto a solvent containing a compound of the type formula $$ROC_nH_{2n}\text{------------}C_xH_{2x}OR_1$$

where R is an acidyl group; $R_1$ is an alkyl or aryl group; $n$ and $x$ are any integers; and the dotted line is a simple bond or a divalent radicle.

2. In a process of removing finish coatings from surfaces, the step of disintegrating the coating by attacking an organic constituent thereof by applying thereto a solvent containing a compound of the type formula $$ROC_2H_4O\text{------------}C_2H_4OR_1$$

where R is an acidyl group; $R_1$ is an alkyl or aryl group; and the dotted line is a simple bond or $C_2H_4O$.

3. In a process of removing finish coatings from surfaces, the step of disintegrating the coating by attacking an organic constituent thereof by applying thereto a solvent containing a compound of the type formula $$CH_3COOC_2H_4O\text{------------}C_2H_4OR_1$$

where $R_1$ is an alkyl or aryl group; and the dotted line is a simple bond or $C_2H_4O$.

In testimony whereof, I affix my signature.

JOSEPH G. DAVIDSON.